(12) United States Patent
Chuah et al.

(10) Patent No.: US 7,171,160 B2
(45) Date of Patent: Jan. 30, 2007

(54) METHOD AND APPARATUS FOR DYNAMIC FREQUENCY SELECTION IN A WIRELESS COMMUNICATIONS NETWORK

(75) Inventors: Mooi Choo Chuah, Marlboro, NJ (US); Kameswara Rao Medapalli, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 568 days.

(21) Appl. No.: 10/609,776

(22) Filed: Jun. 30, 2003

(65) Prior Publication Data

US 2004/0266351 A1    Dec. 30, 2004

(51) Int. Cl.
*H04B 15/00* (2006.01)
(52) U.S. Cl. .............. 455/62; 455/63.1; 455/67.11
(58) Field of Classification Search ............. 455/62, 455/63.1, 63.3, 67.11, 437, 443, 45, 452.1
See application file for complete search history.

(56) References Cited

U.S. PATENT DOCUMENTS 4,718,107 A * 1/1988 Hayes ................ 725/27

6,035,196 A * 3/2000 Hengeveld et al. ........ 455/437

* cited by examiner

*Primary Examiner*—Lee Nguyen
(74) *Attorney, Agent, or Firm*—Matthew J. Hodulik

(57) ABSTRACT

An advance over the prior art is achieved through an efficient method for the dynamic selection of frequencies with low occupancy in a manner that results in minimizing the search for such frequencies and the risk of a large of number of nodes choosing the same frequency. A method for dynamically selecting the frequencies according to the invention includes the following parts. A channel loading indicator that determines if the mobile node needs to look for a new channel. A channel search algorithm that quickly determines the new channel to be used. A tracking algorithm that remembers the channels that were most recently determined to be loaded and hence should be avoided in the near future. In one embodiment of the invention a method of selecting frequencies for use by a device in a wireless communications network is presented. The method includes the steps of monitoring channel usage of given frequencies to determine loaded channels based on whether an associated channel usage threshold has been reached and, if the channel usage threshold has been reached, determining whether to switch from a loaded channel to another channel based on a probability function.

16 Claims, 2 Drawing Sheets

CHN UTILIZATION = $\Sigma\, t_i / T_{obs}$

METHOD AND APPARATUS FOR DYNAMIC FREQUENCY SELECTION IN A WIRELESS COMMUNICATIONS NETWORK

FIELD OF THE INVENTION

The present invention relates generally to communications networks and more particularly to wireless communications regarding such networks.

BACKGROUND OF THE INVENTION

As the deployment of wireless ad-hoc networks increases, the available capacity per wireless node decreases. This is because the number of nodes contending for the wireless channel increases. For example, consider a single wireless channel with CSMA as the access protocol. As the number of nodes increases, the channel occupancy increases and the chance for a particular node to sense an idle channel therefore decreases. In such cases, using more than one wireless channel can increase the capacity, since the number of contending nodes per channel would decrease.

Normally, an ad-hoc network would have several frequencies to choose from, where the main challenge is to have the nodes choose frequencies with low occupancy. Since, however, the wireless nodes operate in an ad-hoc manner, there is little co-ordination possible for such a task. Accordingly, there is a need for nodes to dynamically select frequencies with low occupancy in a manner that results in minimizing the search for such frequencies and the risk of a large of number of nodes choosing the same frequency.

SUMMARY OF THE INVENTION

An advance over the prior art is achieved through an efficient method for the dynamic selection of frequencies with low occupancy in a manner that results in minimizing the search for such frequencies and the risk of a large of number of nodes choosing the same frequency. A method for dynamically selecting the frequencies according to the invention includes the following parts. A channel loading indicator that determines if the mobile node needs to look for a new channel. A channel search algorithm that quickly determines the new channel to be used. A tracking algorithm that remembers the channels that were most recently determined to be loaded and hence should be avoided in the near future. In one embodiment of the invention a method of selecting frequencies for use by a device in a wireless communications network is presented. The method includes the steps of monitoring channel usage of given frequencies to determine loaded channels based on whether an associated channel usage threshold has been reached and, if the channel usage threshold has been reached, determining whether to switch from a loaded channel to another channel based on a probability function.

BRIEF DESCRIPTION OF THE DRAWINGS

A more complete understanding of the present invention may be obtained from consideration of the following detailed description of the invention in conjunction with the drawing, with like elements referenced with like references, in which.

DETAILED DESCRIPTION

Figure 1:
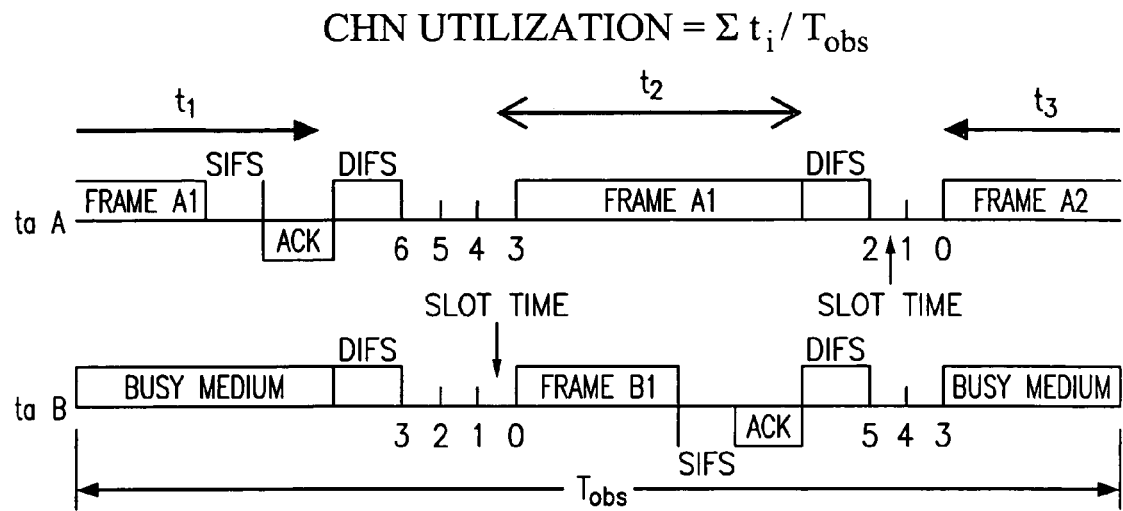
FIG. 1 illustrates one exemplary methodology for computing channel utilization according to the present invention.

The present invention is a methodology for providing improved efficiency for the dynamic selection of frequencies with low occupancy in a manner that results in minimizing the search for such frequencies and the risk of a large of number of nodes choosing the same frequency. Although an exemplary embodiment of the invention is described in connection with the CSMA wireless transmission protocol, it would be apparent to those skilled in the art that the present invention is applicable to other wireless networks and network protocols utilizing dynamic frequency selection including managed Access Point nodes and WLAN systems. Additionally, the present invention is applicable to shared spectrum systems in general.

With respect to dynamic frequency selection, while one can immediately note that having multiple frequencies can increase the capacity, a number of important factors need to be considered. For instance, when different mobile nodes use different frequencies, it is necessary for each mobile to track the frequency at which every node that it is interested in communication with is operating. This is to say that if a mobile node A intends to communicate with all the mobiles in a groups, $\Phi$, then node A needs to track the frequency at which each of the members of $\Phi$ are operating. This way, node A can switch to the correct frequency when it wants to communicate with a particular member node of $\Phi$. Hence, in addition to a routing table, node A needs also to maintain a frequency table. However, since the set of nodes $\Phi$ would be a subset of the set of nodes $\Psi$ for which the node A maintains a routing table, there is no need for a totally different table to maintain the frequencies. One simply needs to introduce a new "channel number" field next to, or in some association with the node's routing information.

While having such a frequency table would enable successful unicast communications, multicasting of traffic could be severely impaired. For example, it is quite possible for the different members of a particular multicast group to be on different frequencies for their unicast communications. Hence, special care needs to be taken to ensure that multicast group members be on the same frequency at the time of multicast.

In addition, any algorithm used for dynamically selecting frequencies needs to take special care to ensure that too many nodes do not select the same frequency. Furthermore, the set of nodes should not keep making the same pattern of frequency selection since that would result in the same set of nodes interfering with each other each time.

A method for dynamically selecting frequencies in accordance with the present invention is now explained. The method essentially includes two parts. The first is a channel loading indicator that determines if a mobile node needs to look for a new channel. Also included is a tracking algorithm that remembers the channels that were most recently determined to be loaded and hence that should be avoided for assignment in the near future. Next is a channel search algorithm that quickly determines a new channel to be used.

Channel Load Monitoring

The concept of a channel loading monitor as it relates to the present invention can be explained with reference to the IEEE 802.11 standard as an example. Any time an 802.11 node listens to an RTS/CTS (request to send/clear to send) message, the node notes that the channel is occupied for so much time into the future (where RTS and CTS messages carry that information). Upon receiving such information, a node updates its NAV (Network Allocation Vector). If a particular channel is heavily loaded this results in the NAV indicating extended busy periods. It must be noted that since the NAV indicates only busy periods for the duration of a particular transmission, the node needs to "add" multiple such busy periods to gain an understanding for how busy a particular transmission channel is with respect to an entire node.

Building upon the information provided by the NAV, a channel utilization measure may be utilized to determine whether a channel is overloaded. In one embodiment of the invention, channel utilization, CU, defined as $\Sigma\ t_i/T_{obs}$, where $t_i$ is the NAV value for each burst and $T_{obs}$ is the observation window is used as a metric to measure whether the channel is overloaded. FIG. 1 shows an illustration of CU for a wireless node, e.g., STA A, for a number of bursts (t1, t2, t3) over a given window T. In accordance with the invention, if CU is greater than a fixed threshold $\lambda_L$ of for example, 0.75, then it is concluded that the channel is overloaded. In addition, a node can also monitor its own backoff window values to determine the channel load condition. (As would be understood by those skilled in the art, a backoff window is the time a device waits to retransmit data once the device has encountered difficulty in an attempted transmission.) A combination of channel busyness and average backoff window values gives an improved estimate of channel load condition. An example of such a combination is to define a metric R=CU+f(avg observed backoff window values). If R exceeds a given threshold, it is concluded that the channel is overloaded. Simulation study may be utilized to determine optimum values to set for the thresholds using R as a metric for specific applications.

Once a node determines that a particular channel is loaded, it includes the channel in a Blocked_Channel_List and does not attempt to choose that channel until an amount of time has passed. In one embodiment of the invention, this time, $T_{MEM}$, may be on the order of several minutes, e.g. 20 minutes.

Channel Switching

Once the channel-loading indicator exceeds a certain threshold as discussed above, not all the nodes detecting the exceeded threshold should look for a new channel. If they do, this would result in the current channel being unnecessarily emptied. Hence, a first step in a channel switching decision is to make each of the nodes randomly decide whether they are going to switch or not. This can be achieved by having each of the nodes which have detected the channel to be loaded to switch with a probability p, where p is, for example, a small number related to the total number of channels available and the number of channel known to be occupied.

If N is the total number of channels and $N_{BLOCK}^m$ is the number of channels that are included in the Blocked_Channel_List of node-m, then the probability with which the node-m decides to choose a new channel should be such that:

It is small for any given value of $\alpha_m = N - N_{BLOCK}^m$

It is an increasing function of $\alpha_m$; this is done since we want p to be an increasing function of alpha. Thus, when alpha is larger, it indicates that there are more free channels, so the probability to switch should be higher if the existing channel is loaded.

One such realization is as follows:

$$p_m = \begin{cases} \dfrac{\alpha_m^2}{\beta(\alpha_m^2 + 10\alpha_m - 1)}, & \alpha_m > 1 \\ \dfrac{1}{\beta(N-1)}, & \text{otherwise} \end{cases} \quad \text{[Equation 1]}$$

where, $\beta$ is a scaling constant. This exemplary expression is given as it is a non-linear function and also satisfies the fact that it is an increasing function of alpha. The above choice of function for p is just an example. As would be understood, one can explore other functions depending on the metrics chosen to be optimized.

Applications

In general, adhoc networks operate such that many nodes are within the communication range of other nodes. Thus, the nodes often generate too much interference for one another and may potentially collide with one another within the same channel. If it is assumed that each node's hardware supports dynamic frequency selection, each node will use the principles of the present invention in combination with Equation 1 or another like algorithm to determine if it is time for the node to switch to different channels. It should be noted that the present invention is different from frequency hopping radios. In frequency hopping radios, each radio performs frequency hopping periodically. In accordance with the present invention, the switching takes place more slowly and will be performed only if the current channel used is loaded.

Another application where the dynamic frequency selection invention will be useful is in an infrastructure mode WLAN system. In such a system, two access points may have overlapping coverage. The two access points can each operate in a separate channel but share a third channel to communicate with nodes within the overlapping coverage area.

Figure 2:
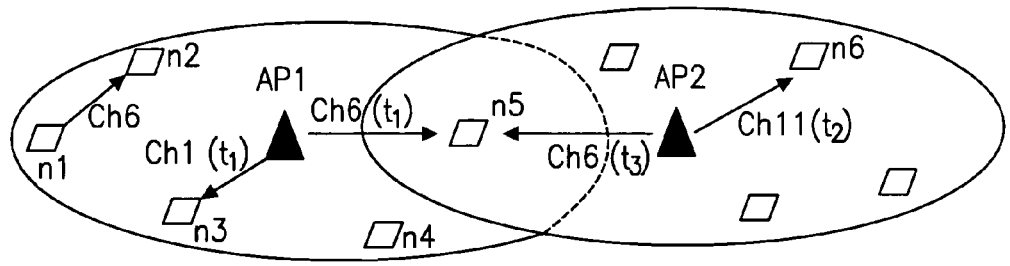
FIG. 2 is an exemplary embodiment of a portion of a wireless communication apparatus which implements a prior art methodology.
Figure 3:
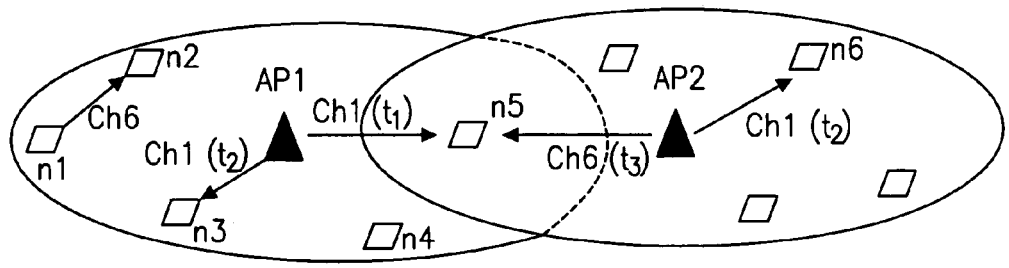
FIG. 3 is an exemplary embodiment of a portion of a wireless communication network which implements a specific example of the methodology of the present invention.

Such a scenario for use of the present invention is presented in FIG. 2. As shown in FIG. 2, without dynamic frequency selection, AP1 may be using Channel 1 to communicate with all nodes within its coverage area. AP1 & AP2 can use Channel 6 to communicate with nodes within the overlapping area. AP2 can use Channel 11 to communicate with other nodes within its coverage area but not in the overlapping area. However with such arrangement, all three channels are used but the aggregated throughput for all three channels are lower than three channels operating independently. With dynamic frequency selection, as shown in FIG. 3, both AP1 & AP2 can use Channel 1 to communicate with other nodes within its own coverage area but not within the overlapping area. When an AP decides to communicate with the nodes within the overlapping area, the AP can switch to a different channel if it detects too much interference or data activities on the existing channel. In the diagram, we illustrate that AP2 decides to use Channel 6 to communicate with node 5. Note in this scenario, we assume that each node is allowed to associate with more than one AP. This feature allows the node to enjoy higher aggregated throughputs if there are dual transceivers in the node (that allows it to operate simultaneously in two different channels). If the node only has one transceiver, then it is assumed that the node indicates to each AP a pseudo sleeping period where it will be operating in a different channel frequency.

Figure 4:
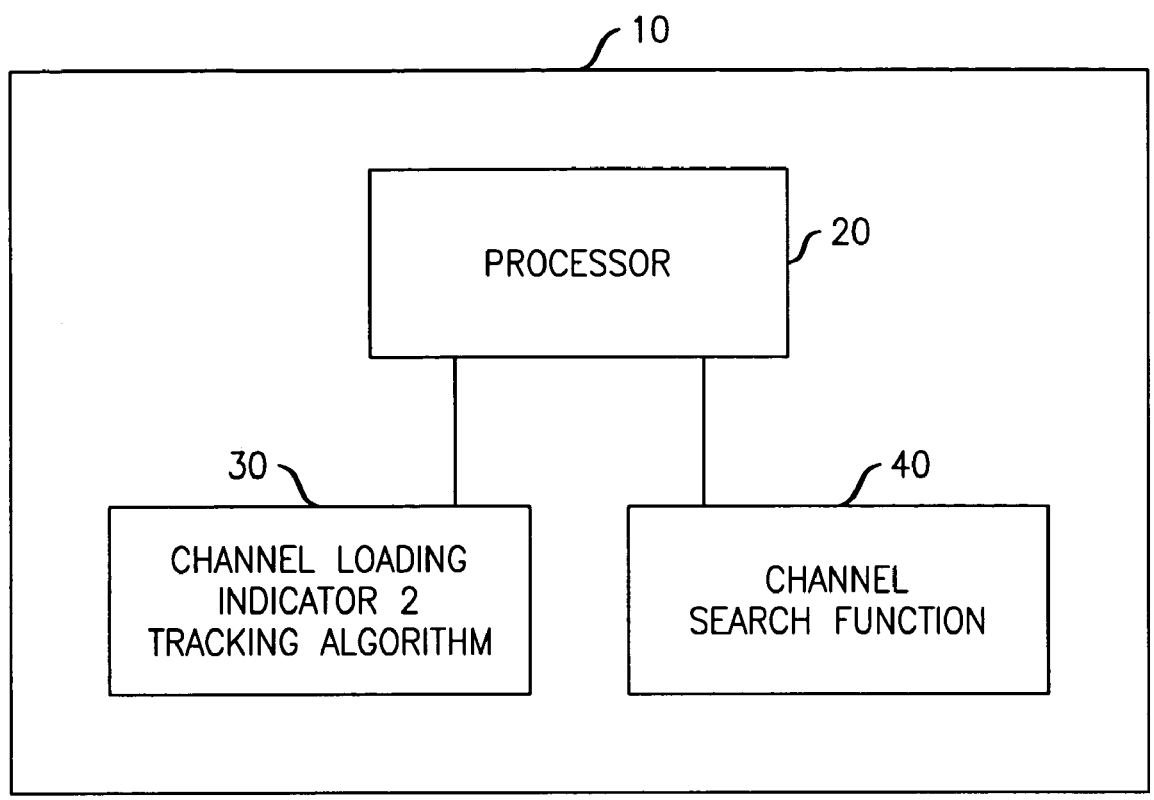
FIG. 4 is an exemplary block diagram of a device used in connection with the present invention.

FIG. 4 shows an exemplary block diagram of a device 10 according to the present invention. In general, the device includes at least two functional blocks which operate in connection with a processor 20. A first block 30 is a channel loading indicator that determines if a mobile node needs to look for a new channel along with a tracking algorithm that remembers the channels that were most recently determined to be loaded and hence that should be avoided for assignment in the near future. Next is a channel search function 40 that determines a new channel to be used.

For clarity of explanation, the illustrative embodiment of the present invention is described as comprising individual functional blocks and/or boxes. The functions these blocks and/or boxes represent may be provided through the use of either shared or dedicated hardware, including, but not limited to, hardware capable of executing software. Use of the term "processor" should not be construed to refer exclusively to hardware capable of executing software. Further, the illustrative embodiment may comprise digital signal processor (DSP) hardware, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A method of selecting frequencies for use by a device in a wireless communications network, said method comprising the steps of;
    monitoring channel usage of given frequencies to determine loaded channels based on whether an associated channel usage threshold has been reached; and
    if said channel usage threshold has been reached, determining whether to switch from a loaded channel to another channel based on a probability function, wherein channel usage is computed utilizing a summation of busy periods from a Network Allocation Vector over an observation interval and computed channel usage further includes a function of average observed backoff window values.

2. The method of claim 1, wherein a loaded channel once determined is placed an a blocked channel list for a given amount of time.

3. The method of claim 1, wherein the probability function for which said device switches from said loaded channel to another channel is relatively small for any given value of $\alpha_m = N - N_{BLOCK}^m$ and is an increasing function of $\alpha_m$, where N is the total number of channels and $N_{BLOCK}^m$ is the number of channels that are included in a blocked channel list of said device.

4. The method of claim 1, wherein the probability function for which said device switches from said loaded channel to another channel is given as $$p_m = \begin{cases} \dfrac{\alpha_m^2}{\beta(\alpha_m^2 + 10\alpha_m - 1)}, & \alpha_m > 1 \\ \dfrac{1}{\beta(N-1)}, & \text{otherwise} \end{cases}$$

where $\alpha_m = N - N_{BLOCK}^m$, where N is the total number of channels and $N_{BLOCK}^m$ is the number of channels that are included in a blocked channel list of said device.

5. The method of claim 1, wherein said device is selected from the group consisting of wireless node and infrastructure access point.

6. The method of claim 1, wherein said wireless network is a shared spectrum wireless network.

7. A method of selecting frequencies for use by a device in a wireless communications network, said method comprising the steps of:
    monitoring channel usage of given frequencies to determine loaded channels based on whether an associated channel usage threshold has been reached; and
    if said channel usage threshold has been reached, determining whether to switch from a loaded channel to another channel based on a probability function wherein said device includes a frequency field for tracking frequencies of other devices to which said device communicates.

8. A method of dynamically selecting frequencies for use by a device in a wireless communications network, said method comprising the steps of:
    monitoring channel usage of given frequencies to determine loaded channels based on whether an associated channel usage threshold has been reached, wherein channel usage is computed utilizing a summation of busy periods from a Network Allocation Vector over an observation interval; and
    if said channel usage threshold has been reached, determining whether to switch from a loaded channel to another channel based on a probability function, wherein the probability function for which said device switches from said loaded channel to another channel is relatively small for any given value of $\alpha_m = N - N_{BLOCK}^m$ and is an increasing function of $\alpha_m$, where N is the total number of channels and $N_{BLOCK}^m$ is the number of channels that are included in a blocked channel list of said device.

9. The method of claim 8, wherein said computed channel usage further includes a function of average observed back-off window values.

10. The method of claim 8, wherein a loaded channel once determined is placed on a blocked channel list for a given amount of time.

11. A apparatus for use in a wireless communications network, said apparatus comprising:
  means for monitoring channel usage of given frequencies to determine loaded channels based on whether an associated channel usage threshold has been reached; and
  means for determining whether to switch from a loaded channel to another channel based on a probability function, if said channel usage threshold has been reached wherein channel usage is computed utilizing a summation of busy periods from a Network Allocation Vector over an observation interval and computed channel usage further includes a function of average observed backoff window values.

12. The apparatus of claim 11, wherein a loaded channel once determined is placed on a blocked channel list for a given amount of time.

13. The apparatus of claim 11, wherein the probability function for which said device switches from said loaded channel to another channel is relatively small for any given value of $\alpha_m = N - N_{BLOCK}^m$ and is an increasing function of $\alpha_m$, where N is the total number of channels and $N_{BLOCK}^m$ is the number of channels that are included in a blocked channel list of said device.

14. The apparatus of claim 11, wherein the probability function for which said device switches from said loaded channel to another channel is given as $$p_m = \begin{cases} \dfrac{\alpha_m^2}{\beta(\alpha_m^2 + 10\alpha_m - 1)}, & \alpha_m > 1 \\ \dfrac{1}{\beta(N-1)}, & \text{otherwise} \end{cases}$$

where $\alpha_m = N - N_{BLOCK}^m$ where N is the total number of channels and $N_{BLOCK}^m$ is the number of channels that are included in a blocked channel list of said device.

15. The apparatus of claim 11, wherein said device is selected from the group consisting of wireless node and infrastructure access point.

16. The apparatus of claim 11, wherein said wireless network is a shared spectrum wireless network.

* * * * *